Oct. 22, 1940.  A. Z. MAMPLE ET AL  2,219,262
SYSTEM FOR DETECTING AND LOCATING DEFECTS IN CABLE SHEATHS
Filed July 21, 1937  2 Sheets-Sheet 1
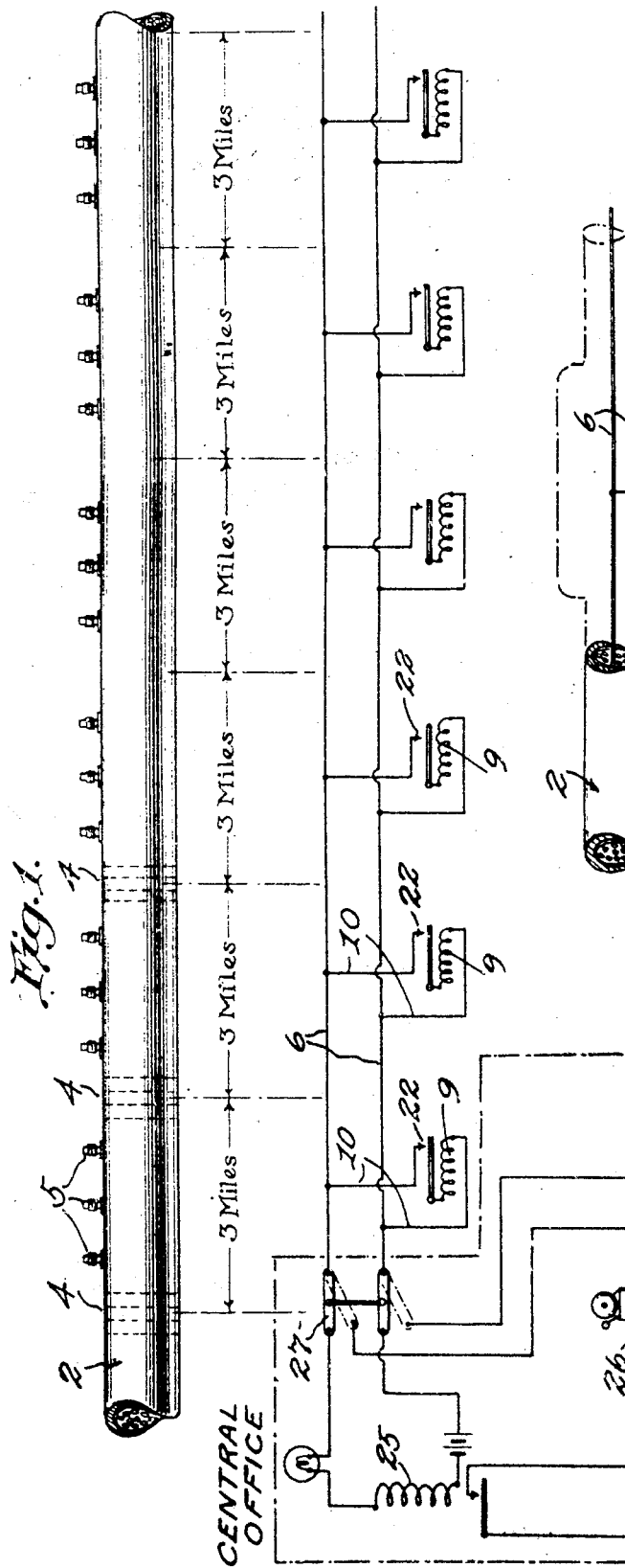
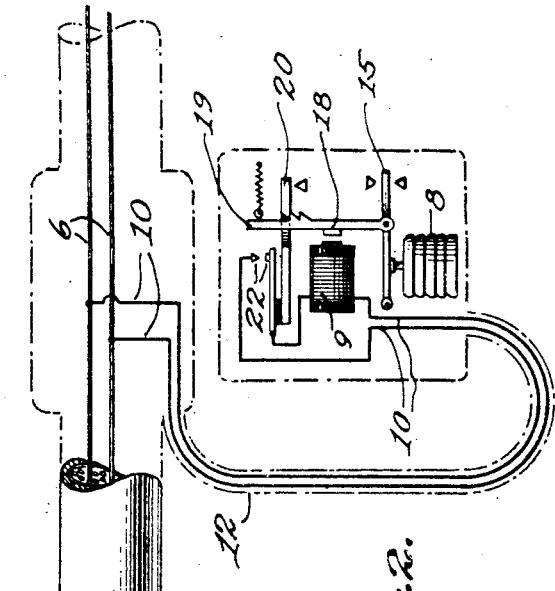
Inventor
A. Z. Mample
D. P. Dickie
Eugene C. Brown
Attorney

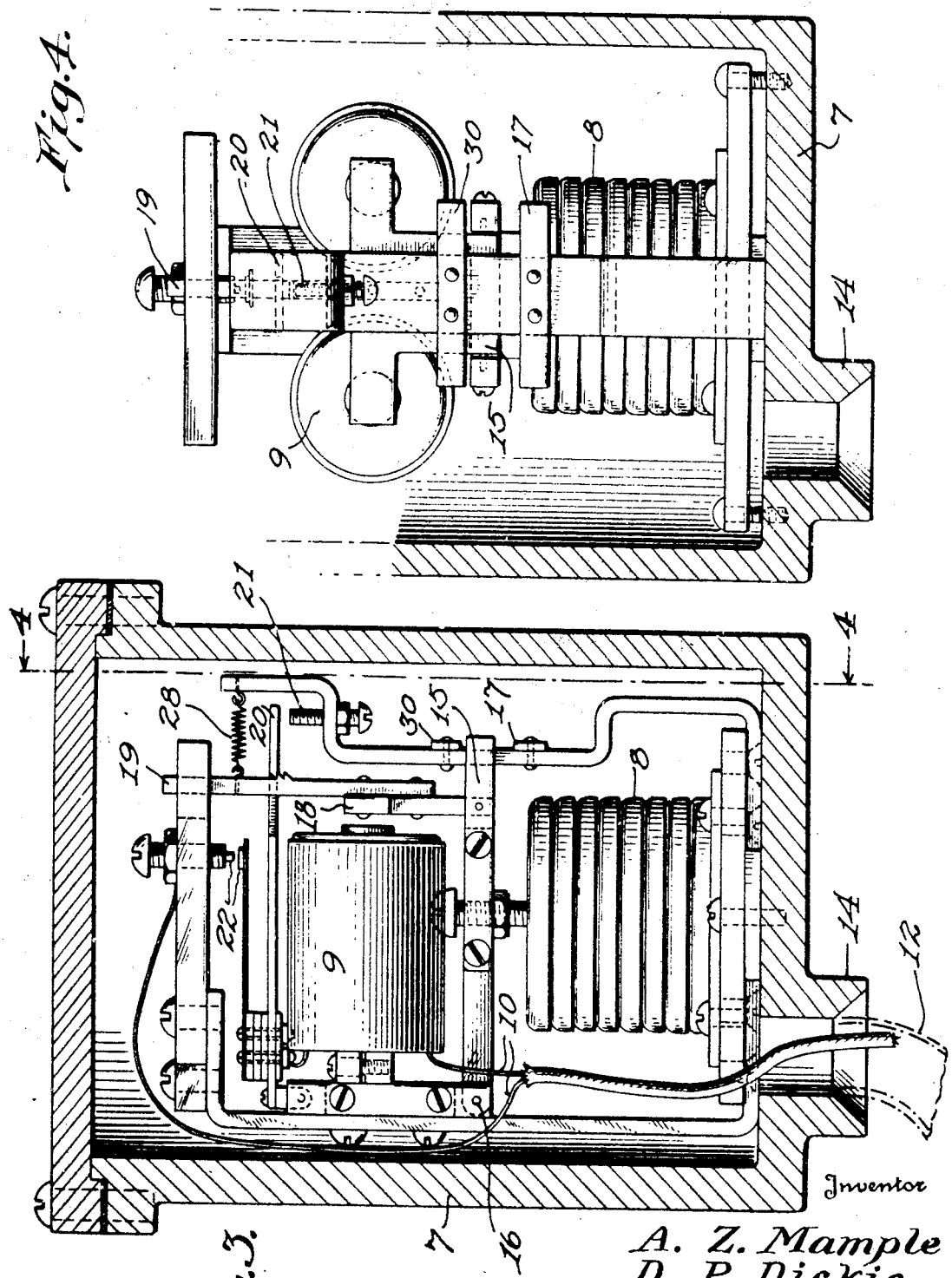

Patented Oct. 22, 1940

2,219,262

UNITED STATES PATENT OFFICE 2,219,262

SYSTEM FOR DETECTING AND LOCATING DEFECTS IN CABLE SHEATHS

Adolph Z. Mample, Glen Rock, N. J., and Douglas P. Dickie, New York, N. Y., assignors to The Western Union Telegraph Company, New York, N. Y., a corporation of New York Application July 21, 1937, Serial No. 154,888

5 Claims. (Cl. 177—311)

This invention relates to a method of and apparatus for maintaining a continuous surveillance of the lead sheaths of communication cables and the automatic indication of a defect in any portion thereof, together with means for determining its location from a central office or station.

Communication cables contain a large number of pairs of conductors which are covered with paper insulation and must therefore be maintained in an absolutely dry condition, since any moisture would destroy the electrical insulating properties of the insulation. It is therefore highly important that the integrity of the lead sheathing of the cable should be maintained throughout its extent in order to maintain the service of the cable without interruption.

Mample has shown in his Patent No. 1,769,524 a method of dividing the cable into sections by means of dams of suitable wax in order that the individual cable sections might be maintained under pressure of nitrogen or other suitable gas and in his Patent No. 1,999,771 and 2,071,968, has shown methods of testing the gas pressure in any section for the purpose of testing the integrity of the sheath of any section. Such testing is necessary before a cable can be maintained under permanent gas pressure. The above procedure has made it possible to bring a defective cable up to the approximate electrical standard of a new cable. But of course such methods do not maintain or insure the maintenance of the cable in that condition.

The object of our invention is to provide a method of maintaining a constant supervision of the gas pressure in each section of the cable by causing a predetermined decrease in pressure in any section to automatically operate an indicator at the central office or supervisory station, together with means for immediately making a test at said station to determine the particular section in which said reduction in gas pressure exists. Another object is to provide means for determining at the station the approximate rate of decrease in pressure in the defective section to thereby determine the character of the defect. A further object is to provide means whereby the operator at the control station may cause the supervisory pressure actuated device at the defective section to return to normal unoperated or open position, whereby the indicator at the control section may receive indications from any cable section.

In the following detailed description of the invention, we shall refer to the accompanying drawings, in which—

Figure 1 is a schematic diagram illustrating my invention applied to a communication cable;

Figure 2 is a fragmentary detail view illustrating the pressure controlled device located at a cable section;

Figure 3 is a side elevation of the pressure actuated device enclosed in a gas tight housing or casing, which is shown in section; and Figure 4 is an end view taken on the line 4—4 of Fig. 3. In order to install our supervisory cable pressure indicating and alarm system, the cable 2 is sectionalized by means of dams 4 located at suitable distances apart, such as three miles, and each section is then placed under pressure of approximately 12 pounds by forcing oil-pumped nitrogen gas or equivalent through valved nipples 5 which have been applied in the manner shown in Mample Patent No. 1,998,766.

A pair of conductors 6 extending throughout the cable is employed for the supervisory cable pressure alarm circuit. The alarm relay of the pressure controlled device is connected across the alarm circuit at approximately the center of each cable section.

The pressure controlled monitor device located at each section is shown in Figs. 3 and 4. The parts are contained in a gas-tight casing 7 and comprise a pressure actuated device, such as the well-known expansible Sylphon bellows 8, which contains a certain internal gas pressure and an electro-magnet 9 for restoring the parts to normal open position by an impulse sent from the supervisor's station. The relay is connected by wires 10 with the cable alarm circuit conductors 6, passing through cable stub 12 which enters the casing 7 through the nipple 14 at the bottom and is soldered thereto. The interior of the casing 7 being in direct connection with the cable through the stub 12, is maintained at a normal gas pressure of 12 pounds. This pressure compresses the Sylphon bellows and permits the lever 15, pivoted at 16, to rest against its lower stop 17 and lowering the pivoted armature 18 and attached ratchet-arm 19 until the contact lever 20 rests agaist the stop screw 21, thus holding the contacts 22 open.

When a fault or defect in the cable sheath occurs in any section the gas pressure in that section and in the corresponding relay casing is lowered. As the pressure gradually decreases, the Sylphon bellows is permitted to expand and when the pressure has dropped to a predetermined value, say four pounds, the lever 15 carrying the armature and ratchet-arm 19, is lifted until the contact lever 20 causes the contacts 22 to engage, thereby closing a circuit through the cable conductors 6, to light the lamp 23 and energize the alarm relay 25. The operation of the alarm 26 notifies the office attendant that a fault has developed in the sheath of some section of the cable. The attendant shifts the switch 27 to connect the testing apparatus and measures the resistance of the circuit of the conductors 6 through the contacts 22 of the operated section. This will indicate the line resistance plus 100 ohms of the relay and from this he readily determines the particular section containing the defective sheath. The attendant then applies a current of approximately 25 milliamperes to energize the relay 9 of the monitor device and returns the switch to normal position. The attraction of the armature 18 withdraws the upper tooth of the ratchet-arm 19 from the contact lever 20 and permits it to drop and be retained by the lower ratchet tooth as the arm 19 is retracted by the spring 28. This opens the circuit of the cable conductors 6 at the contacts 22, thereby restoring the entire alarm circuit to normal and in condition to receive an alarm signal from any cable section. In case defects occur simultaneously in more than one section, the relay resistances of the defective sections are in parallel across the circuit and by comparing the meter reading with a table of the predetermined resistances showing the resistance readings when the relays of the various sections are in multiple circuit, the attendant can at once locate the particular sections which are defective.

While the alarm signal from the defective section indicated that the gas pressure had dropped from 12 pounds to 4 pounds, this did not necessarily show that the fault required immediate attention. The fault might be a very minute aperture or crack which permitted the gas to escape so slowly that many days elapsed before the pressure was lowered to four pounds. Consequently the attendant merely made a record of the section and the time when the alarm signal was received.

As the pressure in said defective section continues to decrease until it reaches a pressure of only 2 pounds, the lever 15 again lifts the armature and ratchet-arm 19 until the contact lever 20 causes the contacts 22 to engage and send a second alarm signal through the cable alarm circuit 6. The office attendant makes the same test as previously and applies a current to energize the monitor relay 9. The attraction of the armature 18 permits the contact lever 20 to drop below the lower tooth on the ratchet-arm 19 and rest on the stop 21. The separation of the contacts 22 restores the cable alarm circuit 6 to normal open position, thus leaving the circuit operative for all of the other cable sections. The lever 15 can now bear against its upper limit stop 30 and the parts remain in this condition until the pressure is restored in the defective cable section. When the pressure within the defective section is restored the relay and Sylphon bellows, together with their connected parts are thereby automatically reset by the pressure within the cable which is communicated to the casing of the monitor pressure alarm device. The interior of the Sylphon bellows is charged to a pressure of about 2 pounds, so that changes in pressure due to temperature changes will not actuate the relay. Thus if there is no loss in gas volume, the relay will not operate falsely since a rise in cable pressure, due to temperature, tending to depress the bellows, will be accompanied by a rise in pressure in the bellows tending to expand the bellows. Thus the apparatus will cause a signal only upon loss in gas volume.

When the office attendant observed that a second signal had been received from said defective cable section, he thereby knew that the pressure had been reduced to two pounds and by noting the time which had elapsed since the first signal was received and hence the time required for the pressure to change from 4 pounds to 2 pounds, he could determine the character of the fault and whether it was a minute very slow leak or whether it was one which required immediate repair by the linemen. Thus if the pressure should drop from 4 pounds to 2 pounds in five hours, it would indicate a large defect which would require immediate steps to prevent moisture from entering the cable and breaking down the electrical insulation of the circuits carried in the cable. However, if it required one or two months for the pressure to drop from 4 pounds to 2 pounds it would indicate a very small defect which could be taken care of more economically by recharging said cable section to 12 pounds pressure and await perhaps another ten months for the pressure to drop or until the defect had increased in size.

I have given a detailed description of our arrangement for automatically indicating the occurrence of faults in the sheaths of communication cables and for determining the location of the defects together with the construction of the particular apparatus illustrated for the purpose of clearly disclosing the invention but it is to be understood that various changes and other embodiments of my invention are contemplated within the scope of our claims.

We claim:

1. Means at a central station for detecting the magnitude of a condition at a remote point resulting in a variable quantity comprising electrical contacts at said point connected to a circuit terminating at said station, means operable to close said contacts at a predetermined value of said quantity, means at said station responsive to closure of said switch including a source of low voltage applied to said circuit, electro-responsive means in the circuit at said remote point operable only when a source of higher voltage is applied to said circuit to reopen the contacts and condition them for reclosing at another predetermined value of said quantity, and means at said station for applying such higher voltage to said circuit.

2. A supervisory system for indicating the occurrence of faults in the lead sheaths of communication cables divided into sections sealed at their ends and placed under a certain gas pressure, which comprises a signaling device at each station having a pair of electrical contacts connected in multiple to a circuit terminating at a central office, a pressure controlled device for each section subjected continuously to the pressure in the respective section, said device operating at a predetermined pressure to close the said contacts of the respective section, an indicating device at the central office, including a source of low voltage connected to said circuit, and responsive to the closure of any of said pairs of contacts, an electro-responsive device at each section connected to the respective pair of contacts and operating to restore the contacts to open position upon transmitting an electrical current of higher voltage over said circuit through the contacts and electro-responsive device from said office, and means at said office operable to measure the resistance of the circuit through the closed contacts and the corresponding electro-responsive device to thereby determine the particular faulty section.

3. In a communication system having a metal sheathed cable provided with sections sealed at their ends and placed under a predetermined gas pressure, means for locating faults or defects in the cable sheath comprising electrical contacts for each section connected in multiple to a circuit terminating at a central station, a pressure controlled device for each section connected to the cable and operating to close said contacts at predetermined pressures, a signal indicating device including a source of low voltage, at said central station responsive to closure of said contacts, electro-responsive means in circuit with said contacts to restore said contacts to open position and means at said central station for transmitting electrical impulses of higher voltage to actuate said electro-responsive means.

4. In a supervisory system for indicating the occurrence of a fault and the location thereof in the sheaths of lead sheathed cables which are divided into sealed sections and placed under gas pressure, a signaling device at each section comprising a pair of contacts, a pressure controlled device for each section connected to the cable and having means to actuate said contacts to closed position at a predetermined pressure and an electro-responsive device in circuit with said contacts and operatively connected to restore said contacts to open position upon transmitting an electrical current of higher voltage over said circuit through said contacts and electro-responsive device.

5. In a supervisory system for indicating the occurrence of a fault and the location thereof in the sheaths of lead sheathed cables which are divided into sealed sections and placed under gas pressure, a signaling device at each section comprising a pair of contacts, a pressure controlled device for each section connected to the cable to actuate said contacts to closed position at a plurality of predetermined pressures and an electro-responsive device in circuit with said contacts and operatively connected to restore said contacts to open position after each operation to thereby condition the contacts for operation at another pressure.

ADOLPH Z. MAMPLE.
DOUGLAS P. DICKIE.